United States Patent [19]

Kamiya et al.

[11] 4,082,406
[45] Apr. 4, 1978

[54] METHOD AND APPARATUS FOR CONNECTING LEADS OF A ROTOR

[75] Inventors: Hiroyuki Kamiya, Hitachi; Ken Takahashi, Tokaimura; Seiji Watanabe; Tomohisa Kanazawa, both of Hitachi, all of Japan

[73] Assignee: Hitachi, Ltd., Japan

[21] Appl. No.: 738,368

[22] Filed: Nov. 3, 1976

[30] Foreign Application Priority Data

Nov. 15, 1975  Japan .................... 50-137632

[51] Int. Cl.² ............................... H01R 13/00
[52] U.S. Cl. ..................... 339/112 L; 310/71; 339/117 R
[58] Field of Search ........ 339/112 R, 112 L, 117 R; 310/71, 64, 61, 58, 54

[56] References Cited

U.S. PATENT DOCUMENTS 3,056,055  9/1962  Willyoung et al. ............ 310/64 X

*Primary Examiner*—Roy Lake
*Assistant Examiner*—DeWalden W. Jones
*Attorney, Agent, or Firm*—Craig & Antonelli

[57] ABSTRACT

A method and apparatus for connecting together leads of a rotor of a water-cooled turbogenerator wherein a cooling medium sealing pipe is used for connecting or joining each hollow axial lead to each hollow radial lead in a revolving magnetic field. The pipe is connected at one end to the hollow axial lead and at the other end to the hollow radial lead, whereby the two leads can be readily connected together while ensuring sealing of the cooling medium in the pipe.

7 Claims, 7 Drawing Figures

METHOD AND APPARATUS FOR CONNECTING LEADS OF A ROTOR

BACKGROUND OF THE INVENTION

This invention relates to methods and apparatus for connecting together leads of rotors, and more particularly to connection of an axial lead to a riser lead in a revolving magnetic field of a water-cooled turbogenerator.

In rotors of rotary electric machines of a large size, particularly of turbogenerators, an increase in the capacity of a rotor makes it necessary to cause a cooling liquid of high thermal capacity, such as water or oil, to flow through the field coils in order that cooling can be carried out effectively. In such case, a cooling liquid is supplied from one end of a rotor shaft to flow therethrough in a manner such that the cooling liquid will flow through hollow leads in the rotor shaft to the field coils arranged in the vicinity of the outer marginal portion of a rotor drum. The cooling liquid which has done work is discharged from one end of the rotor shaft. Thus there is a need to provide a radially oriented liquid passage for connecting each hollow lead to each field coil. The present practice is to use a lead pipe for this purpose. Thus the lead pipe performs a dual function of passing a cooling liquid therethrough and conducting an exciting current to the field coils.

The hollow lead should be connected or joined to the lead pipe in a manner such that there will be no leakage of the cooling medium through the joint, a current can be conducted satisfactorily and the joint has high mechanical strength. However, in a turbogenerator which rotates at high speed, difficulty is encountered in forming a satisfactory joint between the hollow lead and the lead pipe due to a small space available because of the need to reduce the diameter of the rotor and the difficulty with which insulation is effected.

SUMMARY OF THE INVENTION

An object of this invention is to provide a method and apparatus for connecting together leads of a rotor which obviate the aforementioned disadvantages of the prior art, wherein a hollow axial lead inserted in an axial bore of a rotary shaft for passing a cooling medium therethrough is connected to a radial lead inserted in a radial bore of the rotary shaft for passing a cooling medium therethrough, in a manner such that joints can be formed readily while ensuring sealing of the cooling medium in the leads.

Another object of the invention is to enable connection of a hollow axial lead to a hollow radial lead to be readily effected in a limited space while ensuring sealing of the cooling medium in the leads, to enable a connecting operation to be performed with a high degree of efficiency, and to increase reliability of the joints formed between the leads.

The outstanding characteristic of the invention is that a cooling medium sealing pipe is used in addition to a lead pipe to solve the problem of how to provide liquid-tight joints between the leads, such cooling medium sealing pipe being connected at one end to a hollow axial lead and at the other end to a hollow radial lead.

DESCRIPTION OF THE PREFERRED EMBODIMENT

Figure 1:
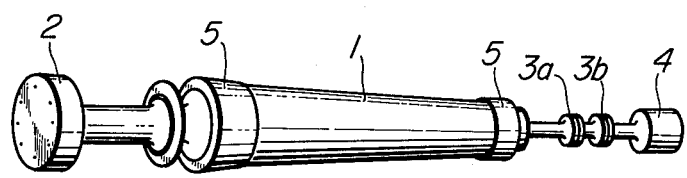
FIG. 1 is a perspective view of a rotor of a water-cooled turbogenerator.

A rotor of a water-cooled turbogenerator in which this invention can be incorporated will first be described in general. As shown in FIG. 1, the rotor 1 of a unitary steel structure has at one end thereof a coupling 2 for directly connecting the rotor 1 to a turbine of a prime mover and at the other end thereof positive and negative pole collecting rings 3a, 3b and a water supply and discharge pump 4 for supplying and discharging cooling water. Hollow field coils are inserted in a rotor slot, and a holding ring 5 is fitted over the outer periphery of an end portion of an iron core so as to hold in place, against a centrifugal force, end portions of the coils and water supply and discharge pipes projecting outwardly of the iron core through the end of the slot.

Figure 2:
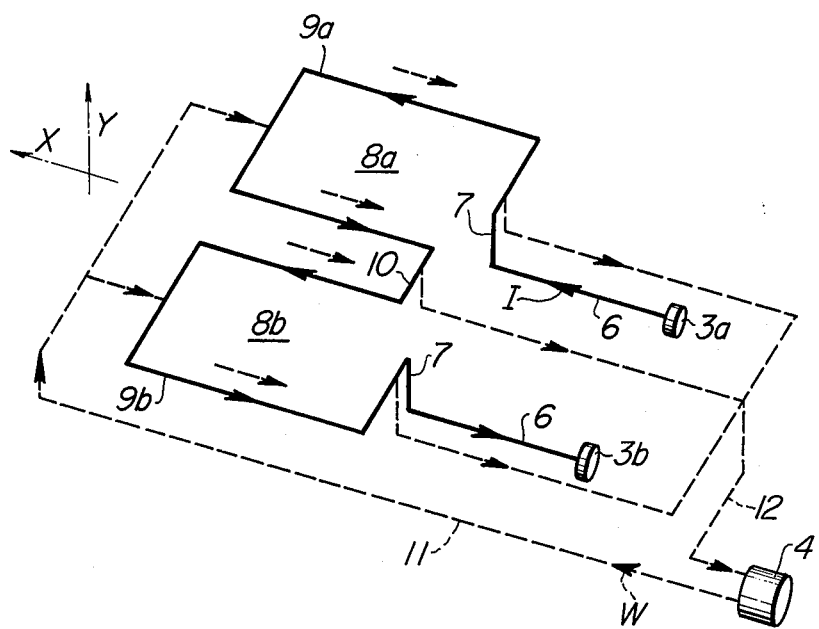
FIG. 2 is a view in explanation of flows of a field current and cooling water through a rotor of a water-cooled turbogenerator.

A field current is supplied from the collecting rings 3a, 3b through leads to the hollow field coils, and cooling water is supplied by means of the supply and discharge pump 4 to the hollow field coils. FIG. 2 shows flows of the field current and the cooling water, with solid lines representing a flow of the field current whose direction of flow is indicated by solid line arrows while broken lines representing a flow of the cooling water whose direction of flow is indicated by broken line arrows.

More specifically, the field current I flows from the positive pole collecting ring 3a in an axial direction X of the rotor shaft through an axial lead 6, passes through a riser lead 7 disposed in a radial direction T of the rotor, flows through a hollow field coil 9a forming a north pole magnetic field 8a, and transfers through an interpole crossover line 10 to the other hollow field coil 9b forming a south pole magnetic field 8b, from which the field current returns to the negative pole collecting ring 3b through another riser lead 7 and another axial lead 6 of the rotor.

On the other hand, cooling water W is supplied from the supply and discharge pump 4 through a feed water pipe 11 inserted in the central bore of the rotor to the hollow field coils 9a, 9b forming the north and south pole magnetic fields 8a, 8b respectively to cool the same. After cooling the hollow field coils 9a, 9b the cooling water W is discharged through a water discharge pipe 12 into the pump 4. As can be seen in this flow chart, no cooling water W flows through the axial leads 6 and riser leads 7 from the collecting rings 3a, 3b, because the electric circuit is formed separately and independently of the water circuit. This causes a marked rise in the temperature of the axial leads 6 and riser leads 7. If the dimensions of the leads 6, 7 can be increased, the rise in the temperature of the leads can be kept below a certain level. However, an increase in the dimensions of the leads 6, 7 raises the problem of requiring a large space in a structure of limited space and makes it difficult to maintain the rotor in a high centrifugal force field.

Thus it is desirable that the field current be conducted by the leads 6, 7 and at the same time the cooling water be made to flow through the leads to cool the same.

Figure 3:
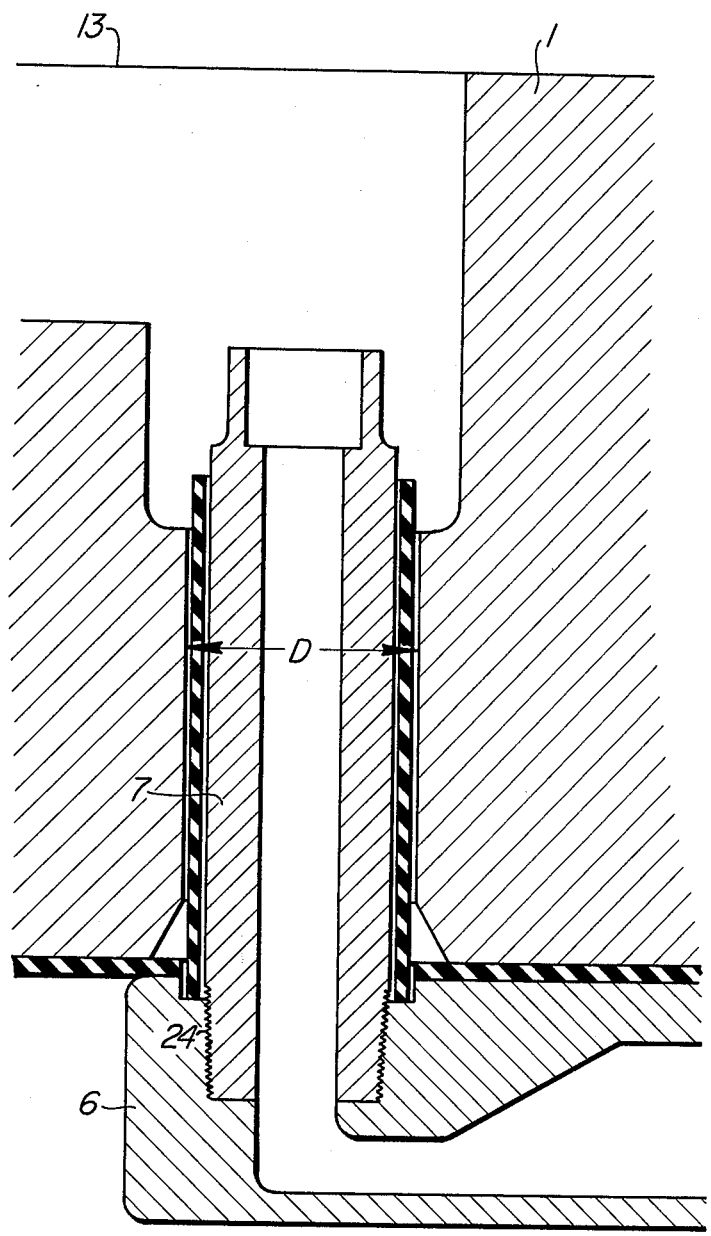
FIG. 3 is a sectional view, on an enlarged scale, of a lead connecting apparatus for a rotor of the prior art.

FIG. 3 shows one form of the structure of the prior art which enables the aforesaid object to be accomplished. In the figure, the axial lead 6 and riser lead 7 are in the form of hollow conductors which are used not only for conducting a field current but also for causing cooling water to flow therethrough. In connecting the axial lead 6 to the riser lead 7, they can be readily interconnected by threadably connecting them at a threadable connecting portion 24 as shown. However, it is not possible, merely by threadably connecting the two leads 6, 7 to ensure that liquidtight seal is provided to the connecting portion of the leads because of high pressure of the cooling water (hydraulic pressure) within the leads resulting from high speed rotation of the rotor.

Thus, in order to provide sufficiently high liquidtight seal to the connecting portion between the leads 6, 7 to prevent leakage of water therethrough, it is necessary that the leads 6, 7 be rigidly joined together by welding or brazing. However, difficulty is encountered in performing a welding or brazing operation because the operation should be performed in a long and narrow area, due to the facts that it is impossible to increase the diameter D of the bore in the rotor in which the riser lead 7 is inserted because there are limits to the stress applied to the rotor, and that there is a large distance between a surface 13 of the rotor and the threadable connecting portion 24. Besides, a problem arises as to the reliability of the weld or brazed joint formed.

A preferred embodiment of the invention which obviates the aforementioned disadvantages of the prior art will now be described with reference to FIG. 4 to FIG. 6.

Figure 4:
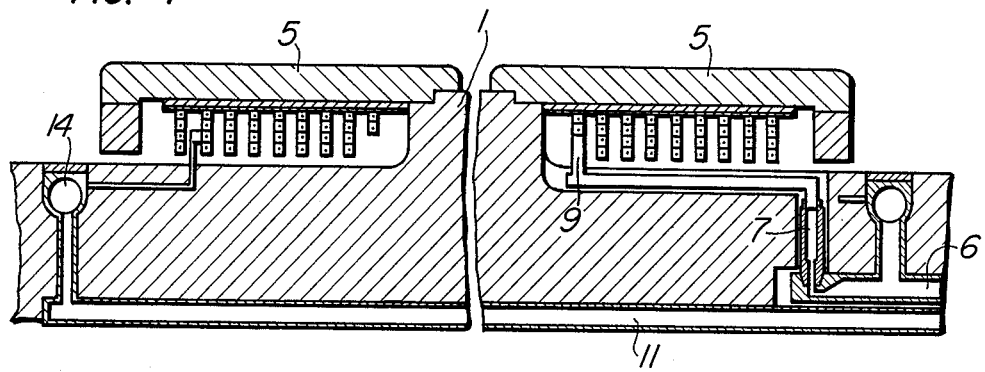
FIG. 4 is a vertical sectional side view of a rotor of a water-cooled turbogenerator in which this invention is incorporated.

FIG. 4 is a vertical sectional side view of a rotor of a water-cooled turbogenerator in which a field current from the positive pole collecting ring passes, as shown, through the axial lead 6 and the riser lead 7 into the hollow field coils 9 to form a magnetic field. Then the current returns to the negative pole collecting ring by passing through a similar riser lead and a similar axial lead (not shown) on the other side. Meanwhile the cooling water flows from the supply and discharge pump through the feed water pipe 11 inserted in the central bore of the rotor 1, and is introduced through a header ring 14 into the hollow field coils 9 to cool the same. Then the cooling water returns to the supply and discharge pump through another set of riser lead 7 and axial lead as aforementioned.

Figure 5:
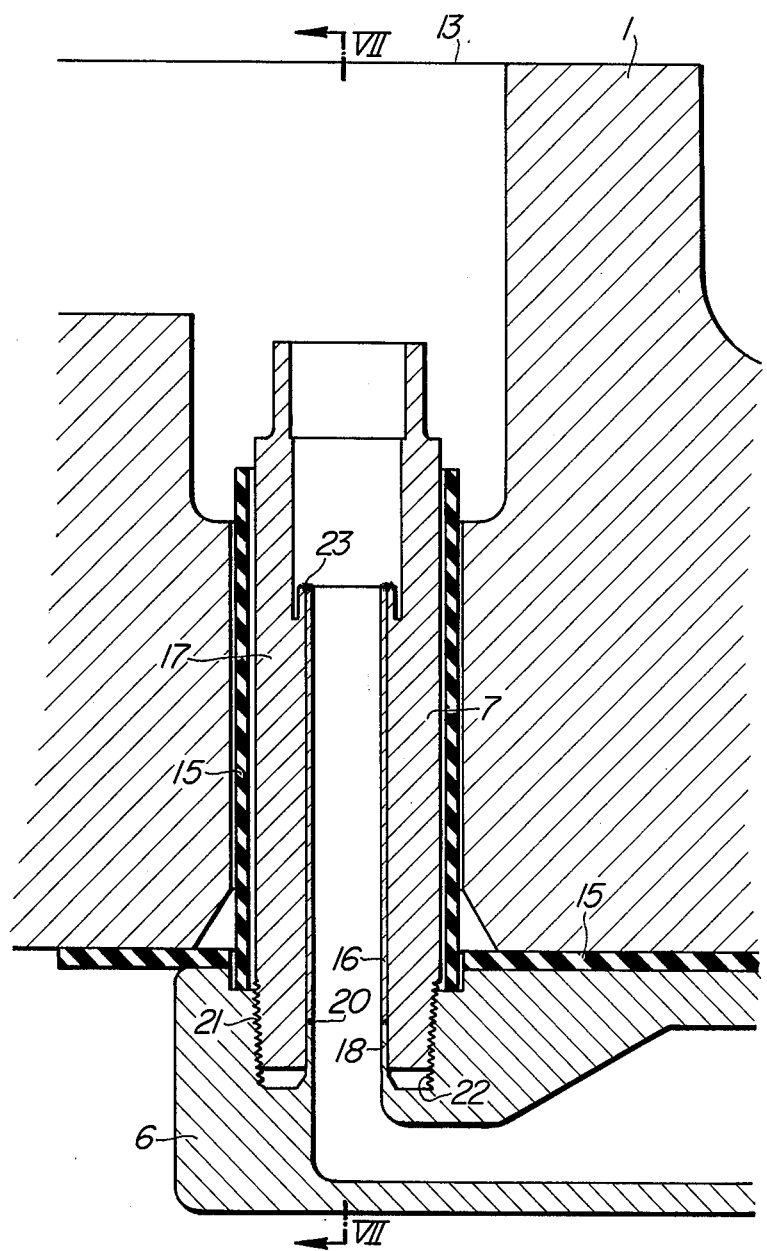
FIG. 5 is a sectional view, on an enlarged scale, of a lead connecting apparatus for a rotor comprising one embodiment of the invention.

FIG. 5 shows the detailed construction of joints between the axial lead 6 and the riser lead 7. The axial lead 6 and the riser lead 7 are insulated with respect to the earth by means of an insulating pipe 15. The riser lead 7 comprises an inner cooling water pipe 16 and an outer lead pipe 17, the cooling water pipe 16 being joined at one end thereof to a projection 18 formed at one end of the axial lead 6 by butt brazing silver solder.

Figure 6:
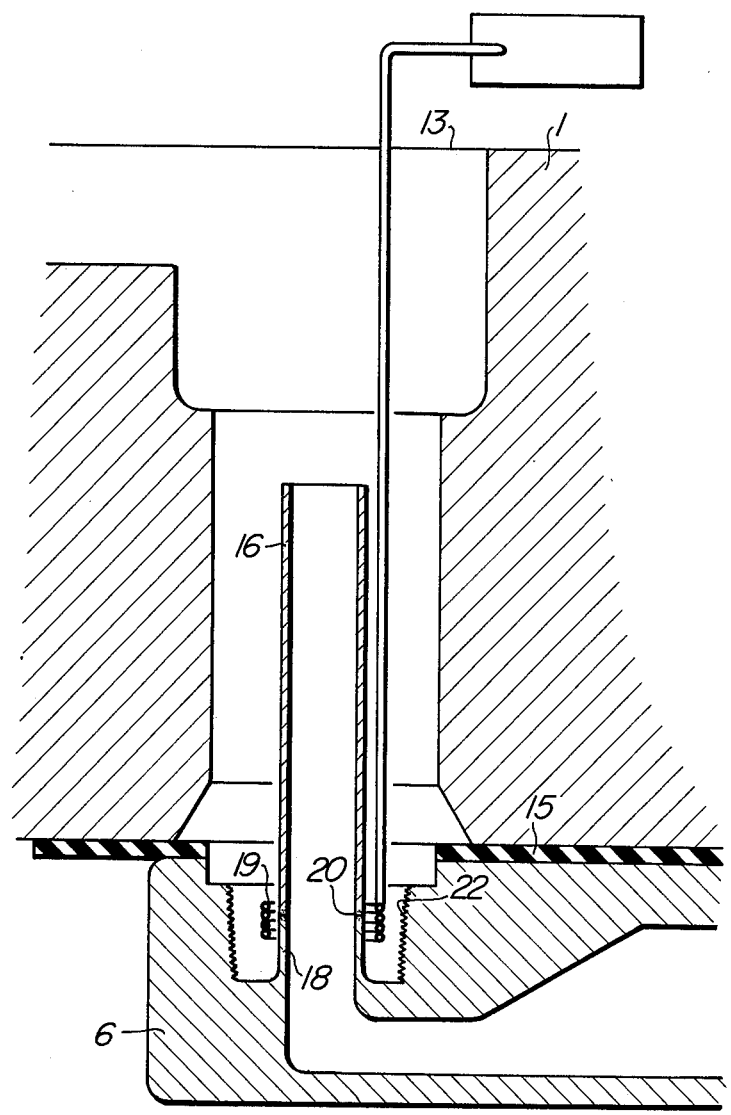
FIG. 6 is a sectional view, on an enlarged scale, showing the manner in which a brazing operation is performed by the lead connecting apparatus shown in FIG. 5.
Figure 7:
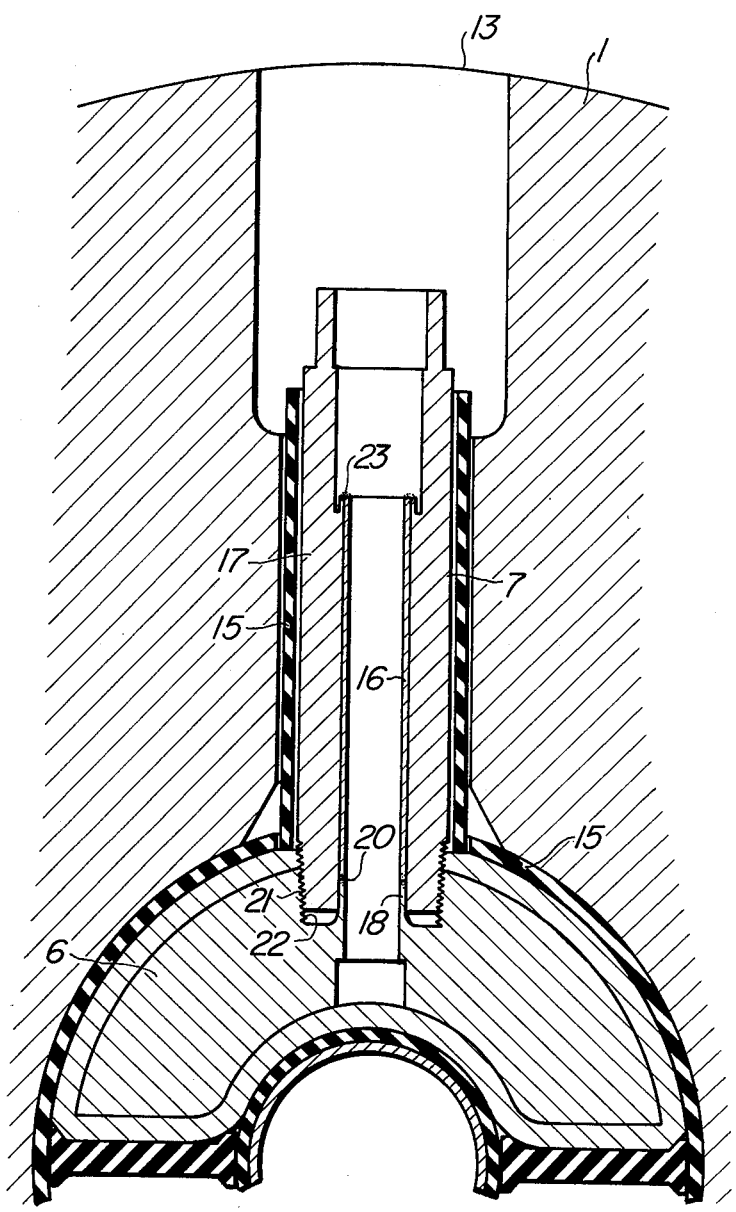
FIG. 7 is a sectional view taken along the line VII—VII of FIG. 5.

The cooling water pipe 16 can be readily joined by brazing to the projection 18 of the axial lead 6 by arranging a work coil 19 for high frequency brazing in a manner to surround portions of the two members to be joined by brazing, as shown in FIG. 6, before the lead pipe 17 and the insulating pipe 15 are inserted in a radial bore in the rotor 1. A joint 20 formed by brazing can be readily examined visually by means of a direct optical viewer or by using various kinds of nondestructive inspection methods.

Then the lead pipe 17 is fitted over the outer periphery of the cooling water pipe 16, and an externally threaded portion 21 of the pipe 17 is threadably engaged in an internally threaded portion 22 of the axial lead 6. Thereafter the other end of the cooling water pipe 16 is joined at 23 to an inner surface of the lead pipe 17 by silver brazing. This brazing operation can be readily and positively performed because it is performed in a position which is near to the surface 13 of the rotor 1 or to an open end of the radial bore 7.

From the foregoing description, it will be appreciated that the connections or joints between the axial lead 6 and the radial lead 7 can be formed by silver brazing in a manner such that the joints have sufficiently high liquid tightness to prevent leakage of the cooling water therethrough. The operation for providing the joints can be performed readily and positively. In the rotor in which the present invention is incorporated, the field current mainly passes through the two threaded portions 21 and 22 of the lead pipe 17 and the axial lead 6 respectively.

We claim:

1. A method for connecting leads of a rotor wherein hollow axial leads each inserted in an axially extending bore in a rotary shaft for permitting a cooling medium to flow therethrough are electrically and mechanically connected to respective hollow radial leads each inserted in a bore extending radially of said rotary shaft from said axially extending bore for permitting the cooling medium to flow therethrough, comprising the steps of:
   inserting a cooling medium sealing pipe in said radially extending bore and joining the same at one end thereof to one of said axial leads inserted in said axially extending bore before one of the hollow radial leads and an insulating pipe are inserted in said radially extending bore;
   fitting said hollow radial lead over the outer periphery of said cooling medium sealing pipe; and
   joining the cooling medium sealing pipe at the other end thereof to said hollow radial lead.

2. In an apparatus for connecting leads of a rotor wherein hollow axial leads each inserted in an axially extending bore in a rotary shaft for permitting a cooling medium to flow therethrough are electrically and mechanically connected to respective hollow radial leads each inserted in a bore extending radially of said rotary shaft from said axially extending bore for permitting the cooling medium to flow therethrough, the improvement comprising a cooling medium sealing pipe inserted in said radially extending bore and joined at one end thereof to one of said hollow axial leads and at the other end thereof to one of said hollow radial leads fitted over the outer periphery of said cooling medium sealing pipe.

3. A method according to claim 1, wherein said step of joining said cooling medium sealing pipe to said axial lead includes high frequency brazing.

4. A method according to claim 1, wherein said step of joining said cooling medium sealing pipe to said hollow radial lead includes silver brazing.

5. An apparatus according to claim 2, wherein said hollow axial lead includes a projection means, said cooling medium sealing pipe being joined to said projection means.

6. An apparatus according to claim 5, wherein said projection means forms a cup-like groove, and said hollow radial lead is threadedly connected with said hollow axial lead at least partially within said cup-like groove.

7. A connecting installation for electrical leads of a rotor comprising at least one hollow electrical lead of said rotor, at least one second hollow electrical lead of said rotor, said first hollow lead being electrically and mechanically connected to said second hollow lead, and a hollow sealing pipe inserted into one of said first and second hollow electrical leads, and said hollow sealing pipe being sealingly joined at each end to said first and second hollow electrical leads.

* * * * *